United States Patent
Kim et al.

(10) Patent No.: US 7,627,474 B2
(45) Date of Patent: Dec. 1, 2009

(54) LARGE-VOCABULARY SPEECH RECOGNITION METHOD, APPARATUS, AND MEDIUM BASED ON MULTILAYER CENTRAL LEXICONS

(75) Inventors: Nam Hoon Kim, Suwon-si (KR); In Jeong Choi, Hwaseong-si (KR); Ick Sang Han, Yongin-si (KR); Sang Bae Jeong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 528 days.

(21) Appl. No.: 11/510,654

(22) Filed: Aug. 28, 2006

(65) Prior Publication Data
US 2007/0185714 A1    Aug. 9, 2007

(30) Foreign Application Priority Data
Feb. 9, 2006    (KR) .................. 10-2006-0012529

(51) Int. Cl.
*G10L 15/04* (2006.01)
(52) U.S. Cl. .................. 704/254; 704/242; 704/9
(58) Field of Classification Search ............ 704/256, 704/270, 236, 231, 238, 239, 240, 242, 1, 704/3, 4, 6, 7, 9, 10, 257, 254
See application file for complete search history.

(56) References Cited

U.S. PATENT DOCUMENTS

| | | | |
|---|---|---|---|
| 6,076,053 A * | 6/2000 | Juang et al. | 704/236 |
| 6,178,401 B1 | 1/2001 | Franz et al. | |
| 6,205,428 B1 * | 3/2001 | Brown et al. | 704/270 |
| 6,507,815 B1 | 1/2003 | Yamamoto | |
| 7,035,802 B1 * | 4/2006 | Rigazio et al. | 704/256 |

FOREIGN PATENT DOCUMENTS

| | | |
|---|---|---|
| JP | 9-34486 | 2/1997 |
| JP | 9-50291 | 2/1997 |
| JP | 10-116092 | 5/1998 |
| JP | 11-149295 | 6/1999 |
| KR | 1998-702723 | 8/1998 |
| KR | 10-2001-0077042 | 8/2001 |
| KR | 2003-0033394 | 5/2003 |

OTHER PUBLICATIONS

Korean Office Action dated Apr. 27, 2007, issued in corresponding Korean Patent Application No. 10-2006-0012529.
L. Fissore et al., "Very large vocabulary isolated utterance recognition: a comparison between one pass and two pass strategies", pp. 203-206, (1988).

* cited by examiner

*Primary Examiner*—Huyen X. Vo
(74) *Attorney, Agent, or Firm*—Staas & Halsey LLP

(57) ABSTRACT

A speech recognition method including: layering a central lexicon in a tree structure with respect to recognition-subject vocabularies; performing multi-pass symbol matching between a recognized phoneme sequence and a phonetic sequence of the central lexicon layered in the tree structure; and selecting a final speech recognition result via a Viterbi search process using a detailed acoustic model with respect to candidate vocabularies selected by the multi-pass symbol matching.

16 Claims, 5 Drawing Sheets

FIG 3

|     | ~       | _       | !ENTER  | !EXIT   | :       | aa0     | aa1     |
|-----|---------|---------|---------|---------|---------|---------|---------|
| aa  | -2.0731 | -9.8901 | -8.7897 | -8.7897 | -9.6628 | -1.3112 | -0.48   |
| aar | -1.7963 | -9.8901 | -8.7897 | -8.7897 | -9.6628 | -3.8501 | -4.573  |
| ae  | -1.5674 | -9.8901 | -8.7897 | -8.7897 | -9.6628 | -4.9488 | -4.0134 |
| ah  | -2.144  | -9.8901 | -8.7897 | -8.7897 | -9.6628 | -2.5509 | -2.9975 |

FIG. 4

|  | s | ya | r | a | O | e |
|---|---|---|---|---|---|---|
| E | ○ |  | ○ | ○ | ○ | ○ |
| h | ○ | ○ | ○ | ○ | ○ | ○ |
| O | ○ | ○ | ○ | ○ | ○ | ○ |
| a | ○ | ○ | ○ | ○ | ○ | ○ |
| r | ○ | ○ | ○ | ○ | ○ | ○ |
| a | ○ | ○ | ○ | ○ | ○ | ○ |
| s | ○ | ○ | ○ | ○ | ○ | ○ |

STANDARD PATTERN (vertical axis)

RECOGNITION SYMBOL SEQUENCE

LARGE-VOCABULARY SPEECH RECOGNITION METHOD, APPARATUS, AND MEDIUM BASED ON MULTILAYER CENTRAL LEXICONS

CROSS-REFERENCE TO RELATED APPLICATIONS

This application claims the benefit of Korean Patent Application No. 10-2006-0012529, filed on Feb. 9, 2006, in the Korean Intellectual Property Office, the disclosure of which is incorporated herein by reference.

BACKGROUND OF THE INVENTION

1. Field of the Invention

The present invention relates to a method, apparatus, and medium for recognizing a large-vocabulary speech based on a multi-layer central lexicon, and more particularly, to a speech recognition method, apparatus, and medium in which a phonetic dictionary of a large-vocabulary is layered in a tree structure in which the central phonetic dictionary is selected at each node, candidate vocabularies are selected by symbol matching with a phoneme sequence acquired via a phoneme decoder, and a final recognition result is detected.

2. Description of the Related Art

U.S. Pat. No. 6,178,401 discloses a method for reducing search complexity in a speech recognition system in which each node of a search network is assumed as a virtual single-state model, a probability value of the model is a highest probability value from M number of states of an original acoustic model, N number of candidates are searched as a simplified model, and a final recognition result is acquired via a detailed matching operation. However, the described conventional speech recognition method has a problem in which memory demand is increased in proportion to an increase of a number of vocabularies because a size of the search network is not reduced.

Another conventional speech recognition method is introduced by L. Fissore et al., "Very large vocabulary isolated utterance recognition: a comparison between one pass and two pass strategies" (CSELT, Italy, ICASSP'88 and published by IEEE), in which a segment is performed with respect to a given speech by using six representative phonemes to construct a phonemes lattice, recognition subject vocabularies are also modeled as six representative phonemes, and N number of finally matched vocabularies are selected as candidates of first pass by using the two representative phoneme information. However, the another conventional speech recognition method has problems in which the candidates in the first pass are not precise due to using a coarse model and a number of the candidates which have to be considered is increased in proportion to a number of vocabularies in a detailed matching process.

In a conventional multilevel speech recognition method grouping vocabularies in a tree structure, vocabularies whose pronunciation is similar are grouped in the tree structure, a virtual vocabulary representing each group is estimated, and speech recognition is performed through multiple levels. However, the conventional multilevel speech recognition method has problems in which producing a lexicon representing the each node is complicated and an amount of calculating a matching score of the representative lexicon is large.

Accordingly, a method of smoothly performing vocabulary recognition with respect to large vocabularies in a device with restricted resources is seriously required.

SUMMARY OF THE INVENTION

Additional aspects, features, and/or advantages of the invention will be set forth in part in the description which follows and, in part, will be apparent from the description, or may be learned by practice of the invention.

An aspect of the present invention provides a speech recognition method, apparatus, and medium for quickly recognizing large vocabularies in a portable device restricted on resource.

An aspect of the present invention also provides a speech recognition method, apparatus, and medium for performing detailed matching with respect to vocabularies similar to an inputted speech via symbol matching a phoneme recognition result with a central lexicon in a tree structure.

An aspect of the present invention also provides a speech method, apparatus, and medium for grouping vocabularies in a tree structure excellent in an aspect of memory.

An aspect of the present invention also provides a speech method, apparatus, and medium using a simple representative lexicon model by determining a lexicon corresponding to a center of a vocabulary set included in the same group to be a representative lexicon model.

An aspect of the present invention also provides a speech method, apparatus, and medium performing matching at a phoneme level to solve a problem in which a correct vocabulary is eliminated in a latter part of recognition in a search process because a risk of mismatch is increased when using a central lexicon model.

According to an aspect of the present invention, there is provided a speech recognition method including: layering a central lexicon in a tree structure with respect to recognition-subject vocabularies; performing multi-pass symbol matching between a recognized phoneme sequence and a phonetic sequence of the central lexicon layered in the tree structure; and selecting a final speech recognition result via a Viterbi search process using a detailed acoustic model with respect to candidate vocabularies selected by the multi-pass symbol matching.

According to another aspect of the present invention, there is provided a speech recognition apparatus including: a multi-pass symbol matching unit performing multi-pass symbol matching between a recognized phoneme sequence and a phonetic sequence of the central lexicon layered in the tree structure; and a detailed matching unit performing detailed matching to select a speech recognition result using detailed acoustic model with respect to candidate vocabulary sets selected by the multi-pass symbol matching.

According to another aspect of the present invention, there is provided a speech recognition method including performing multi-pass symbol matching between a recognized phoneme sequence and a phonetic sequence of a central lexicon layered in a tree structure with respect to recognition-subject vocabularies; and selecting a final speech recognition result via a Viterbi search process using a detailed acoustic model with respect to candidate vocabularies selected by the multi-pass symbol matching.

According to another aspect of the present invention, there is provided a speech recognition method including: performing multi-pass symbol matching between a recognized phoneme sequence and a phonetic sequence of a central lexicon layered in a tree structure; and performing detailed matching to select a speech recognition result using detailed acoustic model with respect to candidate vocabulary sets selected by the multi-pass symbol matching.

According to another aspect of the present invention, there is provided at least one computer readable medium storing instructions implementing methods of the present invention.

BRIEF DESCRIPTION OF THE DRAWINGS

These and/or other aspects, features, and advantages of the present invention will become apparent and more readily appreciated from the following description of exemplary embodiments, taken in conjunction with the accompanying drawings of which:

FIG. 3 is a diagram illustrating an example of a phoneme confusion matrix in the speech recognition apparatus according to an exemplary embodiment of the present embodiment;

FIG. 4 is a diagram illustrating an example of an output of a phoneme decoder and a standard pattern of a lexicon in the speech recognition apparatus according to an exemplary embodiment of the present embodiment.

DETAILED DESCRIPTION OF THE PREFERRED EMBODIMENTS

Figure 1:
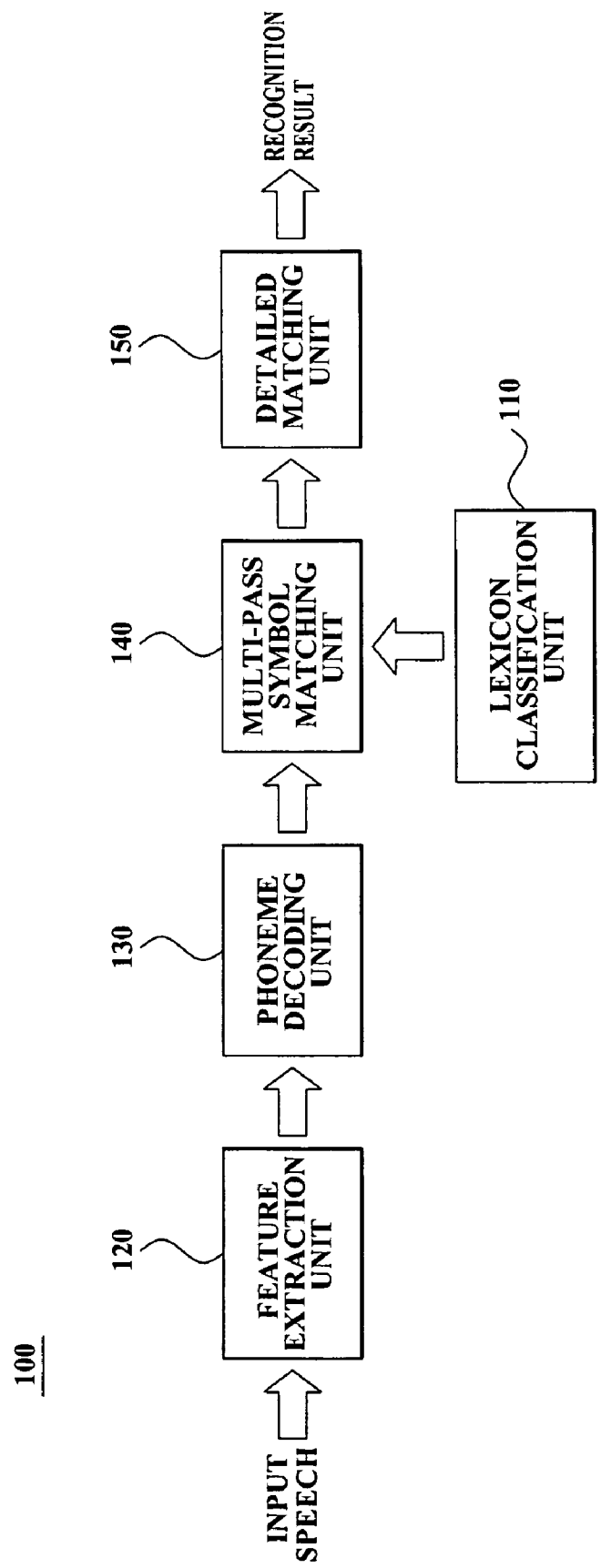
FIG. 1 is a diagram illustrating a configuration of a speech recognition apparatus according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a configuration of a speech recognition apparatus 100 according to an exemplary embodiment of the present invention. Referring to FIG. 1, the speech recognition apparatus 100 includes a lexicon classification unit 110, a feature extraction unit 120, a phoneme decoder 130, a multi-pass symbol matching unit 140, and a detailed matching unit 150.

The lexicon classification unit 110 structures all lexicons with respect to recognition subject vocabularies to classify lexicons. Namely, the lexicon classification unit 110 layers a large-vocabulary phonetic dictionary in a tree structure in which a central phonetic dictionary is established at each node, via a predetermined learning process.

The lexicon classification unit 110 may determine the tree structure in a top-down type or a bottom-up type. The tree structure may be not a binary tree. According to a standard threshold used in clustering for each layer of the tree, a decent number of nodes may be determined to be different. A larger distance threshold may be applied to an upper layer of the tree structure, and a smaller distance threshold may be applied to a bottom layer of the tree structure.

Namely, when a threshold value with respect to the upper layer of the tree structure is applied as, for example, 50, the lexicon classification unit 110 may apply a threshold value with respect to the bottom layer of the tree structure as 40.

The lexicon classification unit 110 may use a Modified K-means clustering method as a lexicon clustering method. A distance between the lexicons is defined as Equation 1.

$$D(Li, Lj) = -\{\log Pr(Li|Lj) + \log Pr(Lj|Li)\} \quad \text{Equation (1)}$$

In this case, Pr (Li|Lj) is a probability value of matching with a recognition symbol sequence corresponding to a lexicon Li when a reference symbol sequence corresponding to a lexicon Lj is given. Pr (Li|Lj) is not identical with Pr (Lj|Li). Pr (Li|Lj) may obtain a matching score via dynamic programming matching by using a phoneme confusion matrix as shown in FIG. 3.

A central lexicon (CLex (1, n) is defined as Equation 2.

$$CLex(1, n) = \underset{Li \in Ng(1,n)}{\operatorname{argmin}} \sum_{Lj \in Ng(1,n)} D^2(Li, Lj) \quad \text{Equation (2)}$$

In this case, Ng (1, n) is neighborhood lexicon of nth node in a first layer.

Figure 2:
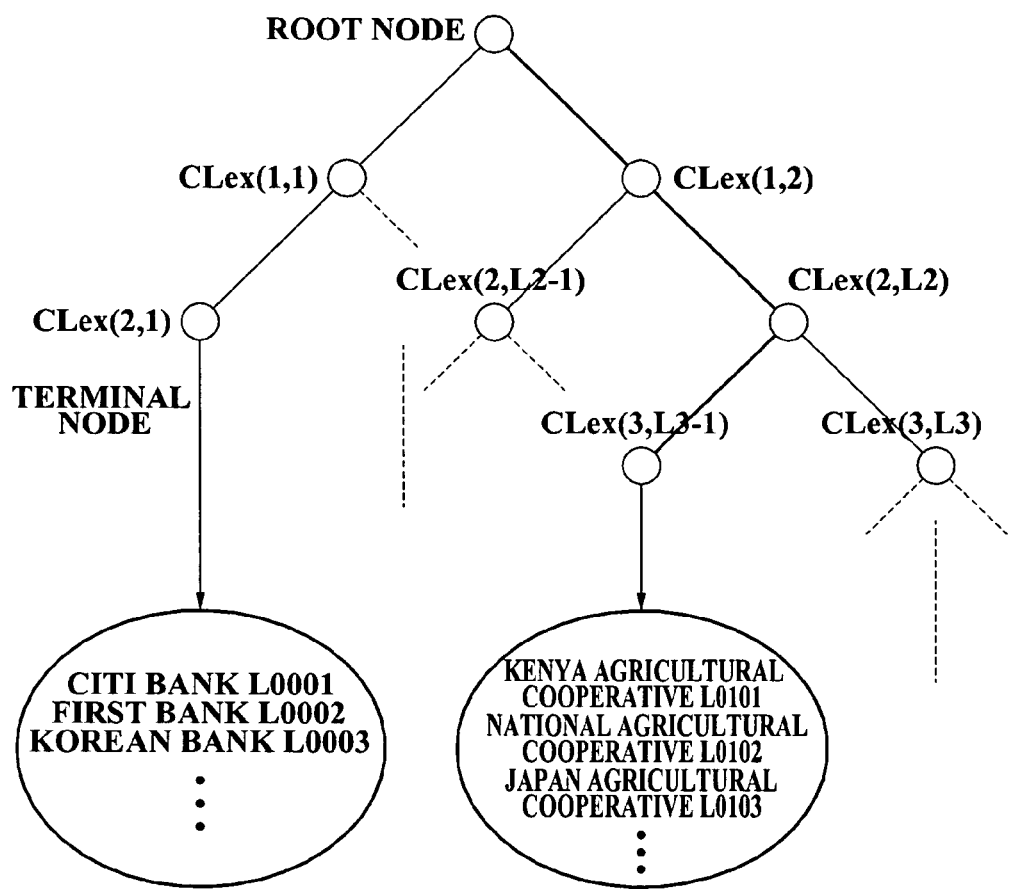
FIG. 2 is a diagram illustrating an example of a layered vocabulary group tree in the speech recognition apparatus according to an exemplary embodiment of the present embodiment.

FIG. 2 is a diagram illustrating an example of a layered vocabulary group tree in the speech recognition apparatus according to the present exemplary embodiment. Referring to FIG. 2, a central lexicon representing a certain node is assigned to the node in the lexicon group tree, and lexicons which are separated from the central lexicon assigned to the node at an interval less than a certain standard are defined as neighborhood lexicons in each terminal node. In this case, CLex (i, j) indicates a jth central lexicon of an ith layer.

The central lexicon of the each node is determined to be a lexicon in a center of vocabulary lexicons included in the node.

The neighborhood lexicon may include a common vocabulary as bank, for example, a CITI bank, a First bank, and a Korean bank, from the terminal node or may include a common vocabulary as agricultural cooperative, for example, a Kenya agricultural cooperative, a National agricultural cooperative, and a Japan agricultural cooperative.

On the other hand, the lexicon classification unit 110 may disjoint the identical vocabulary from other neighborhood lexicon sets to prevent an identical vocabulary from being duplicated in a neighborhood lexicon set of the each terminal node and may establish the identical vocabulary to be overlapped in the other neighborhood lexicon sets.

Namely, for example, when the vocabulary First bank is included in the neighborhood lexicon set of a first terminal nod, the lexicon classification unit 110 may disjoint the vocabulary First bank from the neighborhood lexicon set of other terminal nodes in addition to the neighborhood lexicon set of the first terminal node.

Also, for example, when the vocabulary First bank is included in the neighborhood lexicon set of the first terminal node, the lexicon classification unit 110 may enable the vocabulary First bank to be included in the neighborhood lexicon set of other terminal nodes in addition to the neighborhood lexicon set of the first terminal node.

As described above, when determining the neighborhood lexicon, if overlapping a vocabulary, the lexicon classification unit 110 determines lexicons whose interval from the central lexicon of the terminal node is less than a predetermined value to be the neighborhood lexicon.

The feature extraction unit 120 suppresses background noise of a speech signal inputted to the speech recognition apparatus, detects a speech section of a user from the speech signal whose noise is suppressed, and extracts a feature vector that will be used in recognizing a speech from the detected speech section.

The phoneme decoder 130 coverts the extracted feature vector sequence into N number of candidate phoneme sequences. Also, the phoneme decoder 130 uses a monophone or triphone acoustic model.

Namely, when using the phoneme acoustic model, the phoneme decoder 130 applies a phoneme-level grammar, and when using the triphone acoustic model, the phoneme decoder 130 applies connectivity between contexts.

The multi-pass symbol matching unit 140 searches an optimized path based on a dynamic programming technique and performs multi-pass symbol matching between a recognized phoneme sequence by the recognition decoding unit 130 and a phonetic sequence of the central lexicon layered in the tree structure by the lexicon classification unit 110. A matching score between the recognized phoneme sequence and the phonetic sequence is calculated by using a probability value of a phoneme confusion matrix and by considering a probability of insertion and deletion of a phoneme.

Namely, the multi-pass symbol matching unit 140 may calculate the matching score by using the probability value of the phoneme confusion matrix between the recognized phoneme sequence and the phonetic sequence of the central lexicon layered in the tree structure.

FIG. 3 is a diagram illustrating an example of a phoneme confusion matrix in the speech recognition apparatus according to the present exemplary embodiment. Referring to FIG. 3, the phoneme confusion matrix shows a degree of confusion between a recognition symbol and reference symbols as a probability value. An insertion probability value with respect to the recognition symbol and a deletion probability value with respect to the reference symbol are used. The value of the phoneme confusion matrix is shown as log P (a|b).

A recognition symbol set is a phoneme set used in the phoneme decoder 130, and a reference symbol set is a phoneme set used in a lexicon representation. The recognition symbol set may be identical with the reference symbol set or may be different from the reference symbol set.

FIG. 4 is a diagram illustrating an example of an output of a phoneme decoder and a standard pattern of a lexicon in the speech recognition apparatus according to the present exemplary embodiment. Referring to FIG. 4, a horizontal axis is an output of the phoneme decoder 130 indicating a recognition symbol sequence, and a vertical axis indicates "saraohe" as an example of a reference pattern of a lexicon.

The multi-pass symbol matching unit 140 performs multi-level symbol matching in the direction of top-down in the tree structure as shown in FIG. 2, tracks a node recording a maximum matching score, and repeats the tracking until reaching a terminal node.

Namely, until reaching the terminal node, the multi-pass symbol matching unit 140 may perform symbol matching with respect to N number of recognized candidate phoneme sequence and the phonetic sequence layered in the tree structure to Nth layer.

Also, to prevent an error in a process of multi-pass symbol matching, the multi-pass symbol matching unit 140 searches a plurality of candidate nodes instead of selecting one node, for each layer. A number of the candidate nodes for each layer may be previously determined or may be variable.

When the number of the candidate nodes is variable, the multi-pass symbol matching unit 140 may previously select a predetermined standard value to select the candidate nodes for each layer and may select nodes having the matching score more than the predetermined standard value as the candidate nodes.

For example, when the standard value of a first layer of the tree structure is 50, the multi-pass symbol matching unit 140 may compare the recognized phoneme sequence with the phonetic sequence of the first layer of the tree structure and may select the nodes having the matching score more than 50 that is the standard value of the first layer as the candidate nodes.

The detailed matching unit 150 selects a final recognition result with respect to candidate vocabulary sets obtained from the multi-pass symbol matching process via a Viterbi search process by using a detailed acoustic model. Neighborhood lexicons of each of the terminal nodes in the tree structure are previously compiled to a search network via learning process for a search speed and are stored in a storage medium such as a hard disk driver.

Namely, the detailed matching unit 150 outputs a final speech recognition result according to the detailed matching performed via the Viterbi search process, with respect to, for example, K number of candidate vocabulary sets detected in the multi-pass symbol matching process, by using a phoneme grammar and an acoustic model.

Also, since memory demand is small due to relatively small sized of the neighborhood lexicons of each of the terminal nodes, the detailed matching unit 150 may select the final recognition result by switching and loading a search network selected as the candidate node to perform the detailed matching.

As described above, the speech recognition apparatus according to an exemplary embodiment of the present invention performs the detailed matching with respect to vocabularies similar to an inputted speech by symbol matching a recognized phoneme sequence with a central lexicon in a tree structure, thereby performing smooth speech recognition though resource is limited.

Also, the speech recognition apparatus performs matching in a phoneme level, different from a conventional matching method in which a risk of mismatching occurring when using a central lexicon model is increased, thereby eliminating a risk of removing an important vocabulary from candidates due to the mismatching of a searching process.

Figure 5:
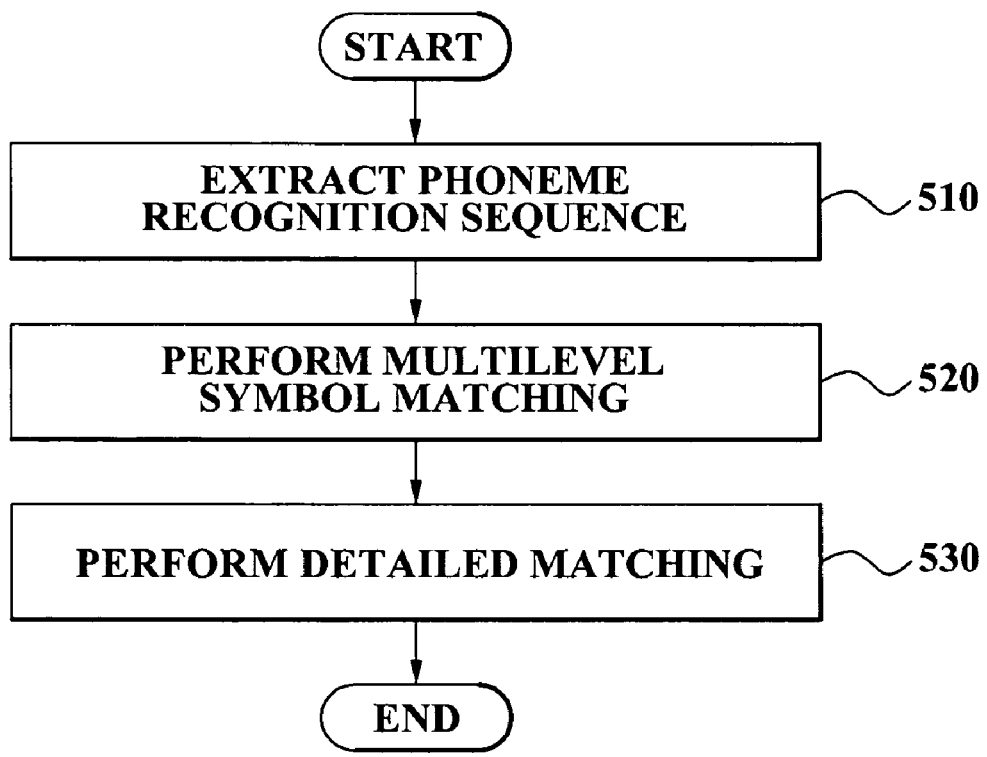
FIG. 5 is a flowchart illustrating a speech recognition method according to an exemplary embodiment of the present invention.

FIG. 5 is a flowchart illustrating a speech recognition method according to an exemplary embodiment of the present invention. Referring to FIG. 5, in operation 510, a speech recognition apparatus extracts a feature vector from a speech signal inputted from a feature extraction unit and extracts N number of recognized phoneme sequences from the extracted feature vector sequence by a phoneme decoder.

Namely, in operation 510, the speech recognition apparatus may remove noise of the signal inputted from the feature extraction unit, may detect a user speech section from the signal from which the noise is removed, may extract the feature vector that will be used in speech recognition from the detected speech signal, and may convert the extracted feature vector sequence into N number of candidate phoneme sequences by the phoneme decoder.

Also, in operation 510, the speech recognition apparatus uses a monophone or triphone acoustic model. In the case of the phoneme acoustic model, a phoneme level coupling theory may be applied. In the case of the triphone acoustic model, connectivity between contexts may be applied.

In operation 520, the speech recognition apparatus performs multi-pass symbol matching that is multilevel symbol matching between the extracted recognized phoneme sequence and a phonetic sequence of a central lexicon layered in a predetermined tree structure.

Namely, in operation 520, when a number of the extracted recognized phoneme sequence is N, the speech recognition apparatus performs N number of multi-pass symbol matching operations between the phonetic sequences of the central lexicon layered in the predetermined tree structure.

In this case, the central lexicon layered in the tree structure may be previously classified via a learning process by a lexicon classifier. Namely, the lexicon classifier constructs all lexicons with respect to the recognition subject vocabularies as the tree structure, assigns the central lexicon representing a node to the node in the tree structure, and defines lexicons in each terminal node, separated from the central lexicon at a distance less than a predetermined standard value, as neighborhood lexicons.

The tree structure has a different number of applied nodes for each layer, according to a standard threshold used in clustering. Namely, since, in the tree structure, a relatively higher distance threshold is applied to upper layers and a relatively lower threshold is applied to bottom layers, a number of nodes in the upper layer is small.

A central lexicon in each node is determined to be a lexicon in a centre of vocabulary lexicons included in the node.

In operation 520, the speech recognition apparatus may cluster the vocabulary lexicons via a unit capable of measuring a distance between two lexicons by using a phoneme confusion matrix, as shown in FIG. 3.

In operation 520, the speech recognition apparatus may calculate similarity between the recognized phoneme sequence and a phonetic sequence of the central lexicon according to the multi-pass symbol matching operation.

In operation 520, to reduce an error of selecting the central lexicon according to the multi-pass symbol matching operation the speech recognition apparatus performs a search process of selecting a plurality of candidates for each layer, instead of selecting one node.

In operation 520, to select the plurality of candidates, the speech recognition apparatus may perform the multi-pass symbol matching in an order of top-down, may track a node recording a maximum matching score for each layer, and repeats the node tracking process until reaching a terminal node. In this case, a number of candidate nodes for each layer may be previously determined or may be variable. In this case, the matching score is calculated using a probability value of a phoneme confusion matrix as shown in FIG. 3.

Namely, in operation 520, when the number of the candidate nodes for each layer is variable, the speech recognition apparatus may previously establish predetermined standard values for selecting the candidate nodes for each layer and may consider nodes having the matching score more than the predetermined standard value as the candidate nodes.

In operation 530, the speech recognition apparatus performs detailed matching for selecting a final recognition result with the candidate vocabularies established via the multi-pass symbol matching via the Viterbi search process using a detailed acoustic model.

In the tree structure, the neighborhood lexicons of the each terminal node is previously compiled to a search network in a learning process for search speed and is stored in a storage medium such as a hard disk driver.

Namely, in operation 530, the speech recognition apparatus may perform the detailed matching by switching and loading the search networks searched as the candidate using small memory demand because the neighbor lexicons of the each terminal node have a relatively small size, for example, generally several hundreds words.

As described above, the speech recognition method according to an exemplary embodiment of the present invention layers a phonetic dictionary of large-vocabularies into a tree structure in which a central phonetic dictionary is selected for each node, selects candidate vocabularies by symbol matching with a phoneme sequence obtained by a phoneme decoder, and detects a final recognition result, thereby quickly and precisely recognizing a speech with respect to more than ten thousand large vocabularies using memory demand relatively less than a conventional method in a device restricted on resource, such as a portable device.

In addition to the above-described exemplary embodiments, exemplary embodiments of the present invention can also be implemented by executing computer readable code/instructions in/on a medium/media, e.g., a computer readable medium/media. The medium/media can correspond to any medium/media permitting the storing of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter.

The computer readable code/instructions can be recorded in/on a medium/media in a variety of ways, with examples of the medium/media including magnetic storage media (e.g., floppy disks, hard disks, magnetic tapes, etc.), optical media (e.g., CD-ROMs, or DVDs), magneto-optical media (e.g., floptical disks), hardware storage devices (e.g., read only memory media, random access memory media, flash memories, etc.). The computer readable code/instructions may be executed by one or more processors. In addition, the above hardware devices may be configured to act as one or more software modules in order to perform the operations of the above-described exemplary embodiments.

According to an aspect of the present invention, there may be provided a method and apparatus for quickly recognizing large vocabularies in a portable device restricted on resource.

According to an aspect of the present invention, there may be also provided a method and apparatus for performing detailed matching with respect to vocabularies similar to an inputted speech via symbol matching a phoneme recognition result with a central lexicon in a tree structure.

According to an aspect of the present invention, there may be also provided a method and apparatus for eliminating a risk of removing a correct vocabulary from candidates due to mismatching in a search process by performing matching in a phoneme level, different from a conventional matching method in which a risk of mismatching occurring when using a central lexicon model is increased.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A computer-implemented speech recognition method comprising:

layering a central lexicon in a tree structure with respect to recognition-subject vocabularies;

detecting a speech section of a user from the speech signal whose noise is suppressed, and extracting a feature vector that will be used in recognizing a speech from the detected speech section;

coverting sequence of the extracted feature vector into N number of candidate phoneme sequences;

performing multi-pass symbol matching between a phoneme sequence and a phonetic sequence of the central lexicon layered in the tree structure; and selecting a final speech recognition result via a Viterbi search process using a detailed acoustic model with respect to candidate vocabularies selected by the multi-pass symbol matching, wherein the tree structure comprises a certain node to assign to the node in the lexicon group tree and a terminal node to define lexicons which are separated from the central lexicon assigned to the node at an interval less than a predetermined standard as a neighborhood lexicons, and wherein the method is performed, using at least one processor.

2. The method of claim 1, wherein the performing multi-pass symbol matching between a recognized phoneme sequence and a phonetic sequence of the central lexicon layered in the tree structure comprises traversing a node recording a maximum matching score for each layer while symbol matching the central lexicon layered in the tree structure, wherein the tracking a node is repeated until reaching a terminal node.

3. The method of claim 1, wherein the performing multi-pass symbol matching between a recognized phoneme sequence and a phonetic sequence of the central lexicon layered in the tree structure comprises selecting a plurality of candidate nodes for each of the layers.

4. The method of claim 3, wherein the candidate nodes are nodes of which a matching score exceeds a predetermined standard value for said each of the layer.

5. The method of claim 1, wherein the matching score is calculated using a probability value of a phoneme confusion matrix.

6. The method of claim 1, wherein the central lexicon represents a certain node and is determined to be a lexicon in a central position from all lexicons included in the node.

7. The method of claim 6, further comprising determining lexicons which are separated from the central lexicon of each of the terminal nodes at a distance less than a predetermined standard value to be neighborhood lexicons.

8. The method of claim 1, wherein the tree structure has a number of nodes, the number is determined according to a standard threshold used in clustering for each of the layers.

9. The method of claim 8, wherein the clustering is performed using a modified K-means clustering method.

10. A computer readable recording storage medium in which a program for executing a speech recognition method is recorded, the method comprising:

layering a central lexicon in a tree structure with respect to recognition-subject vocabularies;

detecting a speech section of a user from the speech signal whose noise is suppressed, and extracting a feature vector that will be used in recognizing a speech from the detected speech section;

coverting sequence of the extracted feature vector into N number of candidate phoneme sequences;

performing multi-pass symbol matching between a recognized phoneme sequence and a phonetic sequence of the central lexicon layered in the tree structure; and selecting a final speech recognition result via a Viterbi search process using a detailed acoustic model with respect to candidate vocabularies selected by the multi-pass symbol matching, wherein the tree structure comprises a certain node to assign to the node in the lexicon group tree and a terminal node to define lexicons which are separated from the central lexicon assigned to the node at an interval less than a predetermined standard as a neighborhood lexicons, and wherein the method is performed using at least one processor.

11. A speech recognition apparatus comprising:

a lexicon classification unit classifying all lexicons, with respect to recognition subject vocabularies, into the tree structure;

a feature extraction unit detecting a speech section of a user from the speech signal whose noise is suppressed, and extracting a feature vector that will be used in recognizing a speech from the detected speech section using at least one processor;

a phoneme decoder coverting the extracted feature vector sequence into N number of candidate phoneme sequences;

a multi-pass symbol matching unit performing multi-pass symbol matching between a recognized phoneme sequence and a phonetic sequence of a central lexicon layered in a tree structure; and a detailed matching unit performing detailed matching to select a speech recognition result using detailed acoustic model with respect to candidate vocabulary sets selected by the multi-pass symbol matching, wherein the tree structure comprises a certain node to assign to the node in the lexicon group tree and a terminal node to define lexicons which are separated from the central lexicon assigned to the node at an interval less than a predetermined standard as a neighborhood lexicons.

12. The apparatus of claim 11, wherein the multi-pass symbol matching unit calculates a matching score using a probability value of a phoneme confusion matrix between the recognized phoneme sequence and the phonetic sequence of the central lexicon layered in the tree structure.

13. The apparatus of claim 11, wherein the multi-pass symbol matching unit traverses a node recording a maximum matching score for each layer and repeats traversing the node until reaching a terminal node.

14. The apparatus of claim 13, wherein the candidate nodes are nodes of which a matching score exceeds a predetermined standard value for said each of the layer.

15. A computer-implemented speech recognition method comprising:

detecting a speech section of a user from the speech signal whose noise is suppressed, and extracting a feature vector that will be used in recognizing a speech from the detected speech section;

coverting sequence of the extracted feature vector into N number of candidate phoneme sequences;

performing multi-pass symbol matching between a recognized phoneme sequence and a phonetic sequence of a central lexicon layered in a tree structure with respect to recognition-subject vocabularies; and selecting a final speech recognition result via a Viterbi search process using a detailed acoustic model with respect to candidate vocabularies selected by the multi-pass symbol matching, wherein the tree structure comprises a certain node to assign to the node in the lexicon group tree and a terminal node to define lexicons which are separated from the central lexicon assigned to the node at an interval less than a predetermined standard as a neighborhood lexicons, and wherein the method is performed using at least one processor.

16. At least one computer readable storage medium storing instructions implementing the method of claim 15.

* * * * *

UNITED STATES PATENT AND TRADEMARK OFFICE
CERTIFICATE OF CORRECTION

| | |
|---|---|
| PATENT NO. | : 7,627,474 B2 |
| APPLICATION NO. | : 11/510654 |
| DATED | : December 1, 2009 |
| INVENTOR(S) | : Nam Hoon Kim et al. |

It is certified that error appears in the above-identified patent and that said Letters Patent is hereby corrected as shown below:

Column 9, Line 7, change "performed," to --performed--.

Column 9, Line 40, after "readable" delete "recording".

Signed and Sealed this

Twenty-third Day of February, 2010

David J. Kappos
*Director of the United States Patent and Trademark Office*